Nov. 24, 1942.  R. L. HIBBARD  2,303,300
METHOD AND APPARATUS FOR SHAPING STOCK
Filed July 2, 1940  4 Sheets-Sheet 1

INVENTOR.
Robert L. Hibbard,
BY Edward A. Lawrence
his attorney

Nov. 24, 1942.   R. L. HIBBARD   2,303,300
METHOD AND APPARATUS FOR SHAPING STOCK
Filed July 2, 1940   4 Sheets-Sheet 2

INVENTOR.
Robert L. Hibbard
BY Edward A. Laurines
his attorney

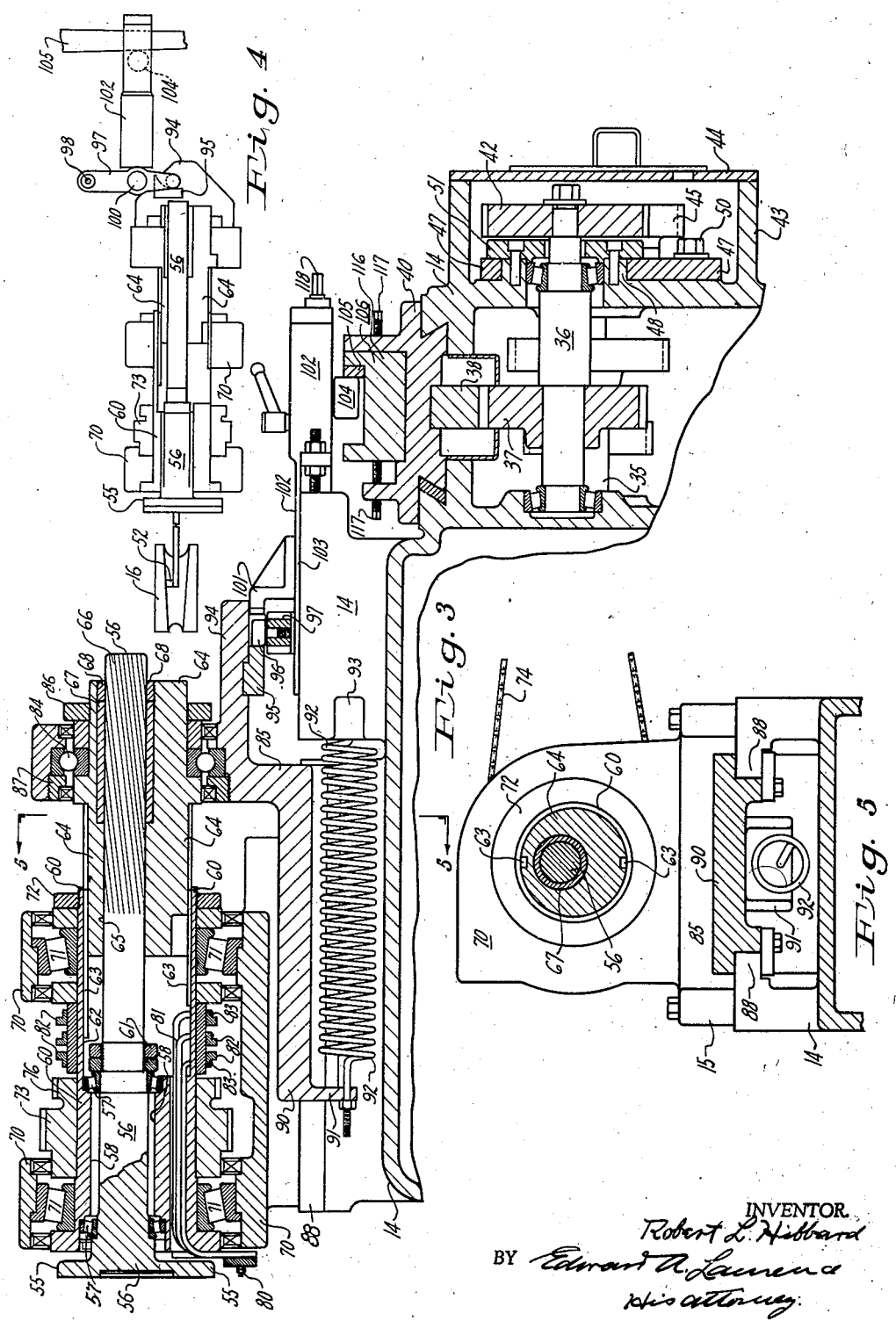

Patented Nov. 24, 1942

2,303,300

UNITED STATES PATENT OFFICE 2,303,300

METHOD AND APPARATUS FOR SHAPING STOCK

Robert L. Hibbard, Bellevue, Pa., assignor of one-half to William K. Stamets, Mars, Pa.

Application July 2, 1940, Serial No. 343,577

24 Claims. (Cl. 51—43)

This invention relates generally to metal working methods and machines for shaping stock and more particularly methods and machines for shaping the internal or external surface of stock by relative longitudinal movement between the work and a rotary cutting tool having planetary motion and operable in a uniplane spiral path.

The method and machine comprising this invention may be advantageously employed for producing swaging or rolling dies, the working faces of which progressively change about their periphery or for producing molds, mandrels and other similar work pieces and the like used in different arts.

The principal object of this invention is the provision of a method and machine for producing work pieces and the like having predetermined characteristic faces.

Another object is the provision of a method and apparatus employing a tool having planetary motion which is controlled by a template to operate in a uniplane spiral path to reproduce a predetermined contour.

Another object is the provision of a machine tool support which is rotatable about its true axis and also about an axis parallel to its true axis so as to follow a predetermined planetary path.

Another object is the provision of a machine having a rotary tool mounted eccentrically on a support and rotatable about its true axis and also about an axis parallel to its true axis so that the rotary tool may follow a spiral planetary path.

Another object is the provision of a machine for shaping stock movable relative to a rotary cutting tool operable in a spiral planetary path.

Other objects and advantages appear hereinafter in the following description and claims.

In the accompanying drawings a practical embodiment illustrating the principles of this invention is shown wherein:

Fig. 3 is an enlarged sectional view of the machine tool mounting taken along the line 3—3 of Fig. 2.

Fig. 4 is a diagrammatic view illustrating the mechanism for controlling the operation of the machine tool in a spiral planetary path.

Fig. 5 is an enlarged sectional view taken along the line 5—5 of Fig. 3.

Figure 1:
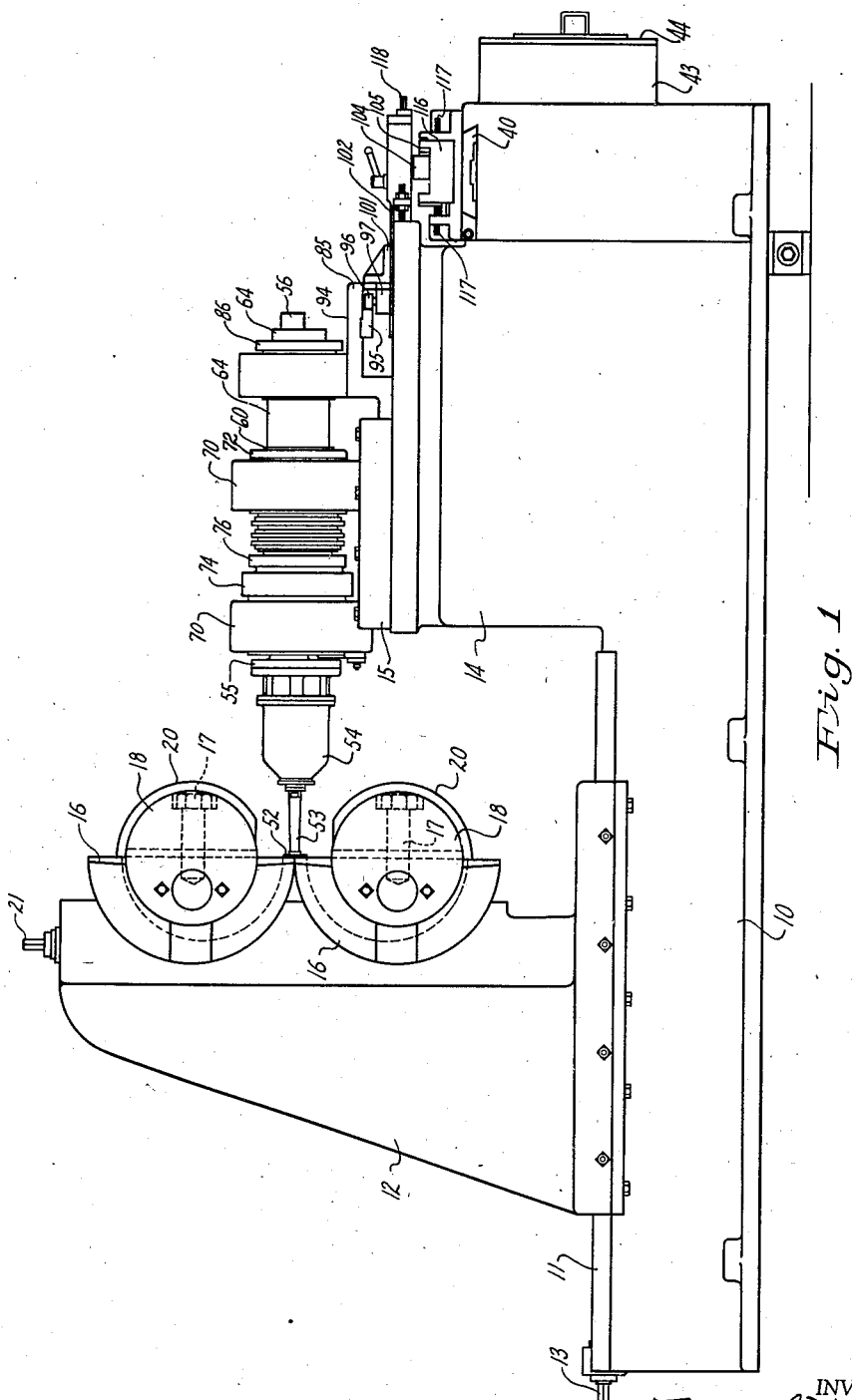
Fig. 1 is a side elevation of a machine constructed in accordance with one embodiment of this invention.

The machine chosen to disclose the principles of this invention is especially adapted to form the die cavities in a pair of rocker swaging dies which are employed in tube reducing machines, although it is apparent that the invention is equally applicable for producing other types of work. The machine is arranged to shape both cavities simultaneously to produce a matched pair of dies. These complemental cavities taper progressively and are thus eccentric to the axis of rotation of the rockers on which they are formed.

To form surfaces of this character the cutting tool is moved in a controlled spiral planetary path. This produces the radial dimensions of the formed surface. The longitudinal dimensions of the surface are produced by relative longitudinal movement of the work and the tool. In the particular machine illustrated for disclosing this invention, the work is moved longitudinally relative to the tool to produce the constantly changing surface and the tool is held stationary. This is particularly advantageous in making arcuate surfaces such as the complemental tapering cavities in the rocker swaging dies. If the surface is to be formed about a straight axis the work and the tool may each be moved longitudinally relative to one another. In this character of machine the work is not rotated axially of the planetary movement of the tool.

Referring to the drawings, the machine comprises the base member or bed 10 provided at one end with the ways 11 arranged to slidably support the column 12. The column may be moved manually along the ways or in conjunction with the operation of the machine by means of the rotary screw or feed rod 13. The other end of the bed extends above the ways as illustrated at 14 for supporting the tool assembly 15 and for housing a portion of the gearing which operates the same.

The work pieces, which in this instance are represented by the segmental rocker dies 16, are fastened by the bolts 17 between the flanged sides of the counterweighted heads 18 formed integral with the spindles 19. Each spindle is journaled in aligned bearings enclosed in the housings of their respective work supporting heads 20 which are independently adjustable vertically on the column 12 by means of the screws 21. The spindles 19 are each provided with a worm gear 22 meshing with their respective worms 23 which are slidably supported on the vertically disposed splined shaft 24. The worm and gear set is right hand on one spindle and left hand on the other and when operated by the common shaft 24 the die on one spindle will be rotated in the opposite direction than the die on the other spindle and thus maintain their proper relation when the complemental cavities are being formed thereon.

Figure 2:
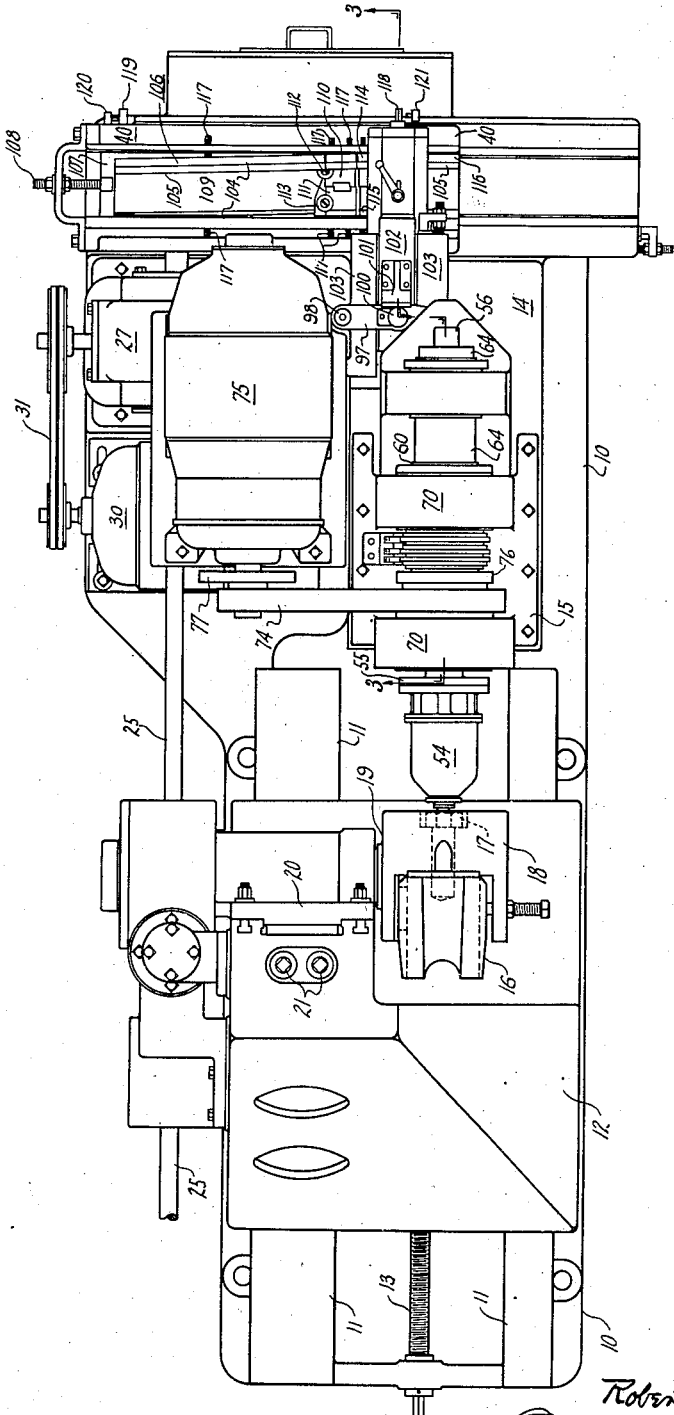
Fig. 2 is a top plan view of the machine shown in Fig. 1.
Figure 6:
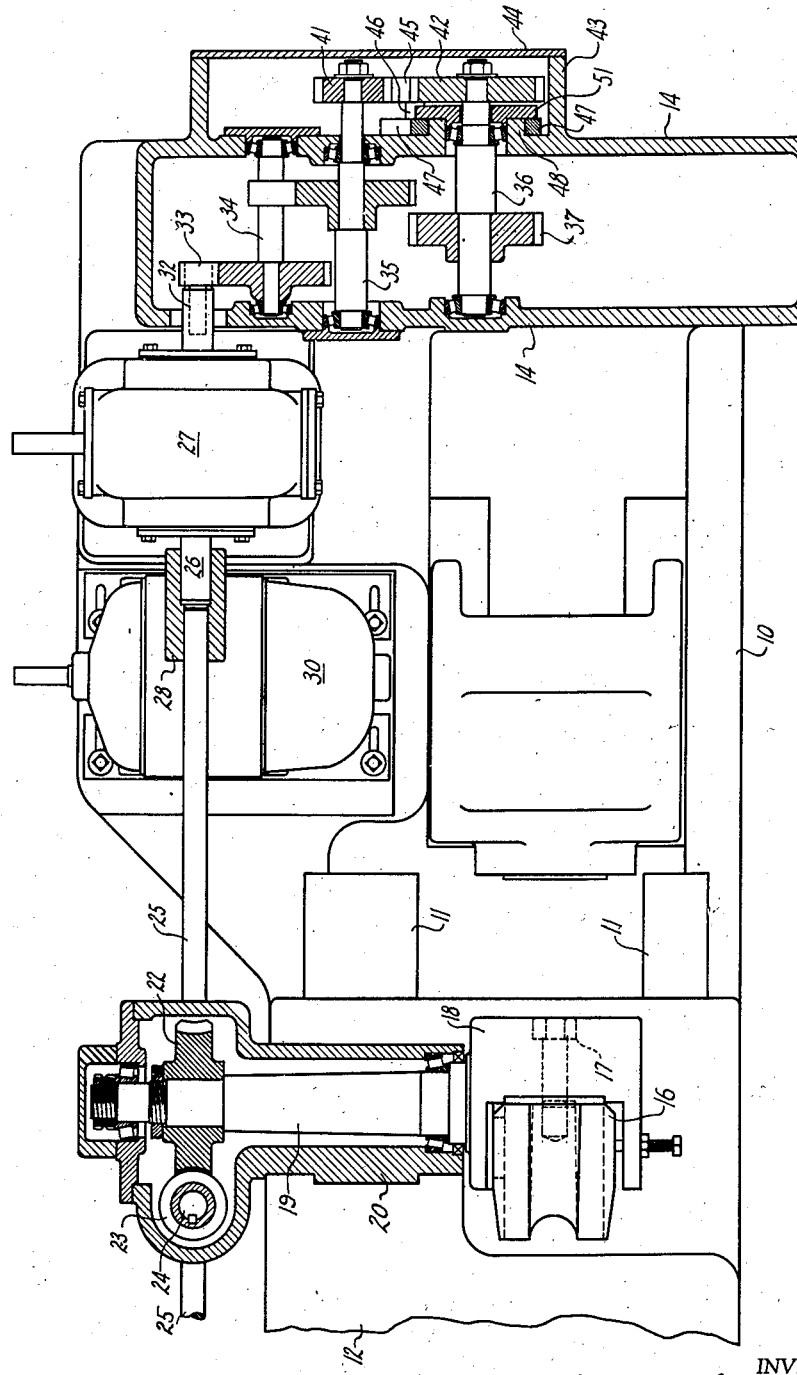
Fig. 6 is a horizontal section illustrating the mechanism for operating the machine tool in its spiral planetary path and for moving the work in conjunction with the movement of the tool.

The splined vertical shaft 24 is carried by aligned bearings supported within each of the housings of the heads 20 and by bearings mounted on the column 12. The lower end of the shaft 24 is provided with a beveled gear which meshes with a beveled gear slidable on the splined end of the horizontal drive shaft 25. The other end of this drive shaft is connected to the output shaft 26, which extends from one side of the speed reducing mechanism 27, by the sleeve coupling 28 as shown in Fig. 6. The speed reducing mechanism is driven by the motor 30 through the belt drive 31 as shown in Fig. 2.

A second output shaft 32 extends from the other side of the speed reducing mechanism 27 and is provided with a pinion 33 which drives the train of reducing gears mounted on the shafts 34, 35 and 36 journaled within the housing 14. The last gear 37 of this train meshes with the rack 38 secured to the bottom of the master slide 40. The intermediate gears 41 and 42 of this reduction train are housed in the extension 43 which is provided with the removable cover 44. These two gears do not mesh with one another but each is in mesh with the idler gear 45 rotatably supported on the stub shaft 46 carried in the quadrant 47 pivotally mounted on the annular boss 48 extending from the housing 14 and concentric with the axis of the shaft 36. The gear 41 on the outer end of the shaft 35 may be changed to provide different speed ratios of the slide 40 to compensate for different sized rocker dies. The idler gear 45 is constantly in mesh with the gear 42 and by swinging the quadrant 47 this idler gear may be placed in mesh with the selected gear 41. The quadrant 47 may be locked in position by the bolt 50 which extends through an arcuate slot in the quadrant into a threaded hole in the housing. The quadrant is held on the boss 48 by the retainer plate 51 as shown in Fig. 3.

The cutting tool 52, which is disposed in the throat of the mating rocker dies, represents a small grinding wheel mounted on the outer end of the shaft 53 extending from the electric motor 54. This motor is secured to the eccentrically disposed circular plate 55 which is an integral part of the tool end of the arbor 56 shown in Fig. 3. The arbor 56 is supported for rotary adjustment on the spaced bearings 57 in the small bore 58 of the spindle 60 and is retained against longitudinal movement by the lock nuts 61 which lock the inner races of the bearings 57 in position.

The large bore 62 of the spindle 60 is provided with oppositely disposed keys 63 which are slidably received in complementary grooves in the reciprocal sleeve 64. This sleeve is provided with the bore 65 which is coaxially disposed with the small bore 58 of the spindle 60. These coaxially aligned bores are eccentrically disposed relative to the axis of the spindle. This eccentricity may be large or small depending upon the character of work that the tool is designed to produce.

The end of the arbor 56 which is disposed within the bore 65 of the sleeve is provided with a series of long helical threads indicated at 66 in Fig. 3. These threads have clearance within the bore 65 of the sleeve but mesh with complementary threads in the split nut 67 which is locked within the bore by the gland nut 68. Since the nut 67 is incapable of movement relative to the sleeve in which it is mounted and the sleeve is movable longitudinally within the large bore 62 of the spindle, longitudinal movement of the sleeve produces a rotary adjustment of the arbor 56. The axis tool 52 being eccentrically disposed to the axis of the arbor 56 is thus subjected to a radial movement when the sleeve 64 is moved longitudinally relative to the spindle 60.

The spindle 60 is rotatably supported on the tool head 70 in the spaced bearings 71 and retained from longitudinal movement by the lock nut 72. These bearings are provided with suitable lubricant seals for retaining oil. A sprocket gear 73 is fixed to the perimeter of the spindle 60 between the spaced bearings for receiving the chain 74 driven by the motor 75 which is mounted above the motor 30. A small sprocket gear 76 is formed integral with the larger gear 73 and is arranged to be connected to the large sprocket gear 77 keyed to the shaft of the motor 75 for operating the spindle at a faster speed.

The electric motor 54 which is mounted on the arbor plate 55 is provided with flexible lead wires connected to the electric terminals 80 on the tool end of the spindle 60. These terminals are in turn connected by the bus wires 81 to the slip rings 82. Suitable collector brushes 83 are provided for contacting these rings to supply current from an electrical source to the motor 54. This motor is preferably of the induction type to avoid commutation trouble and is provided with a three phase winding so it may be easily reversed if necessary.

If the tool 52 is an ordinary metal cutting tool as illustrated in Fig. 4 the tool holder is mounted directly on the arbor plate 55 and the only rotary movement imparted thereto is through the rotation of the spindle 60 as it is not desirable to rotate a cutting tool of this character independently by the motor 54.

The outer end of the sleeve 64 is rotatably supported in the bearing 84 mounted on the top of the carriage 85. The inner race of this bearing is locked to the sleeve by the nut 86 and the outer race is locked to the upwardly extending circular bearing housing on the carriage by the nut 87. This carriage is slidably supported longitudinally of the spindle on the ways 88 and its forward end 90 has a downwardly projecting flange 91 to which the movable end of the helically wound spring 92 is secured. The other end of the spring is held stationary by the plug 93 embedded in the housing 14. The contracting force of the spring 92 thus retains the sleeve 64 in its outermost position, which in this instance maintains the axial center of the tool in alignment with the axis of the rotary spindle 60.

The eccentricity of the plate 55 to the arbor 56 is the same as the eccentricity of the bore 58 in the spindle 60, and the tool 52 may thus be adjusted to operate on an axis concentric to the axis of the spindle. The radial adjustment of the tool is equal to twice the eccentricity measured from the center of the plate 55 to the axis of the arbor 56. The threads 66 on the arbor are provided with a pitch sufficient to rotate the arbor through 180° to produce this maximum radial adjustment of the tool. Thus by reciprocating the carriage 85 the sleeve 64 is moved into and out of the large bore 62 of the spindle 60, which is also being rotated, and the tool 52 is operated in a spiral planetary path. If the tool is a rotary cutter or abrading wheel it is also rotated, independently of the spiral planetary motion imparted thereto, by the motor 54. By interrupting or arresting the movement of the sleeve 64 the spiral movement of the tool is eliminated and the rotary tool is then moved in a planetary path. The speeds of each of these rotary movements may be independently controlled. Thus the radial feed is regulated by the reciprocal movement of the carriage 85 which controls the movement of the sleeve and the axial feed is controlled by the longitudinal movement of the work or the tool relative to one another.

Any convenient means may be employed for moving the carriage 85 to produce the desired rotation of the arbor relative to the spindle. Thus, for instance, the carriage 85 may be provided with a rearwardly projecting shelf 94 having the compensating cam 95 secured to the under face thereof. The face of the cam is engaged by the roller 96 supported on the free end of the multiplying lever 97. The other end of this lever is pivotally secured to the housing 14 as shown at 98 in Fig. 2. The intermediate portion of the lever 97 carries a roller 100 which is engaged by the lug 101 secured on the top of the push bar 102 slidably supported in the ways 103. This push bar extends over the slide 40 which is disposed at right angles thereto and is provided with a depending roller 104 arranged to engage the template 105 supported in the adjustable segmental blocks 106, within the trough of the main slide 40, to change the contour of the template 105. The template and the segmental blocks may be adjustably secured within the slide in any suitable manner. These blocks should be sufficiently flexible to permit longitudinal and transverse adjustments along the template to provide the proper surface contour on the work.

As shown in Fig. 2 the blocks 106 are made in a plurality of sections, some of which are supported on the bottom slide plate 107 which is adjustable longitudinally of the slide by the screw 108. The long block 109 and the short blocks 110 and 111 are pivotally supported on the bottom slide. The blocks 109 and 110 are pivoted on the same pin 112, whereas the block 111, which merely backs up the block 110, is pivoted on the pin 113. The short blocks 114 and 115 partially hidden by the push bar 102 in Fig. 2 are similar to the blocks 110 and 111 and are pivotally secured to the stationary block 116 fastened to the slide 40. With this construction it is necessary to make the template in sections, which permits independent adjustment of each section. These sections are secured to the upwardly extending flanges of the blocks 106. These blocks are adjusted transversely of the slide and held in position by the set screws 117.

The increment change per unit of length of the template 105 is directly proportional to the increment change per unit of length of the complemental cavities produced in the rocker dies. This is made possible by the use of the multiplying lever 97 and the compensating cam 95, both of which may be readily changed to produce any desired proportionate changes in the surface on the work relative to the increment changes in the surface of the template.

To properly set the machine the rocker dies are placed on their respective spindle mountings and set in the position illustrated in Figs. 1 and 2 and the heads 20 are adjusted vertically to properly position the working faces relative to one another for forming the complemental cavities. This is the relative position in which these dies are set in the tube reducing machine. The column is then adjusted to properly position the dies relative to the tool. At this time the axis of the tool 52 is positioned at the innermost point of its radial stroke by placing the slide 40 so that the stationary block 116 and its corresponding template section is opposite the push bar roller 104. The machine should be set in this manner when the rocker dies are mounted or removed from the machine or when it is necessary to change the gear 41 for a rocker die having a different radius.

After the boring tool has been mounted on the arbor as shown in Fig. 4, the machine is ready to operate. The limit of the template adjustment illustrated is sufficient to rotate the arbor 56 through a working arc of approximately sixty degrees. This working arc may be made to function through any portion of the 180° radial stroke of the arbor 56 by operating the feed screw 118 which changes the position of the roller 104 relative to the push bar 102. When the machine is started the boring tool cuts its way through the advancing dies and produces a taper as the template on the slide 40 advances the tool radially. At the end of the boring stroke the rocker dies have been rotated through 180° and the slide 40 has advanced until the trip 119 attached thereto strikes the electric switch 120, which reverses the motor 30 to withdraw the radial feed of the tool and return the dies to the position shown in Figs. 1 and 2 and the trip 119 again strikes the opposite reversing switch 121.

At the end of each complete stroke the feed screw 118 may be advanced manually or automatically, thereby moving the tool 52 further away from the axial center of the spindle. Thus by increments the working arc of the tool is advanced until the complemental cavities in the rocker dies are within a few thousandths of their finished dimensions. These dies are then removed and heat treated and reassembled on the machine. The boring tool is then replaced by a rotary abrading tool operated by the small motor 54, as illustrated in Figs. 1 and 2, and the machine is again operated until the final dimensions of the cavities are attained. The boring tool and the rotary cutting or abrading tool may be operated in both directions. If desired the automatic reversing switches 120 and 121 may be made to stop the motor and an ordinary manual button used for reversing the direction thereof.

The rate of rotatably feeding the rocker dies must be maintained in timed relation with the radial feeding of the tool 52 to produce the proper degree of taper in the cavities. This is accomplished by the single drive through the speed reducer 27.

The spindle 60 and the rotary tool 52 are operated in a clockwise direction as viewed in Fig. 5. The tool is thus rotated into the advancing work in forming the cavities in the rocker dies. However either of the motors 54 or 75 may be reversed to operate the rotary tool in the proper direction relative to the character of surface to be formed.

In this machine the work is not rotated axially of the tool. The boring and cutting tools are relatively light in weight with respect to the work. Thus the tools may be operated efficiently at high speeds while the heavy work is being fed thereto. With this arrangement work pieces, such as these rocker dies, may be finished in a relatively short period of time as compared to a machine in which the work pieces are rotated axially of the tool because of the limiting speed at which these heavy pieces may be so rotated.

I claim:

1. The method of shaping a work piece which comprises causing relative movement between the work piece and a tool longitudinally of the portion of the piece to be shaped and simultaneously imparting a predetermined continuous spiroidic planetary movement of the tool from one end of the cutting path to the other to produce the desired surface.

2. The method of shaping a work piece which comprises causing relative movement between the work piece and a tool longitudinally of the portion of the piece to be shaped and simultaneously imparting a continuous spiroidic planetary movement of the tool from one end of the cutting path to the other, and varying such planetary movement to produce the desired surface.

3. The method of shaping a work piece which comprises causing relative movement between the work piece and a tool longitudinally of the portion of the piece to be shaped and simultaneously imparting a planetary continuous spiroidic movement of the tool from one end of the cutting path to the other, and varying such latter movement to produce the desired surface.

4. The method of shaping a work piece which comprises causing relative movement between the work piece and a tool longitudinally of the portion of the piece to be shaped and simultaneously imparting a planetary continuous spiroidic movement of the tool from one end of the cutting path to the other and varying such planetary movement to produce the desired surface.

5. The method of shaping a work piece which comprises causing relative movement between the work piece and the tool longitudinally of the portion of the piece to be shaped and simultaneously causing the tool to rotate about its true axis and also about an axis other than its true axis so as to follow a predetermined continuous spiroidic planetary path from one end of the cutting path to the other.

6. In a machine for shaping a work piece, the combination of a tool, a support for the tool and the work piece, means for revolving the tool about an axis other than its true axis, means for producing relative movement between the work piece and the tool longitudinally of the surface to be shaped, and means for simultaneously varying the relation of said axes continuously during the shaping operation to produce the desired shape.

7. In a machine for shaping a work piece, the combination of a tool, a support for the tool and the work piece, means for revolving the tool about an axis other than its true axis and also about its true axis, means for producing relative movement between the work piece and the tool longitudinally of the surface to be shaped, and means for simultaneously varying the relation of said axes continuously during the shaping operation to produce the desired shape.

8. In a machine for shaping a work piece, the combination of a tool, a support for the tool and the work piece, means for revolving the tool about an axis other than its true axis, means for producing relative movement between the work piece and the tool longitudinally of the surface to be shaped, and means for simultaneously varying the relation between said axes continuously in predetermined timed relation with said longitudinal movement to obtain the desired shaping of the work piece.

9. In a machine for shaping a work piece, the combination of a tool, a support for the tool and the work piece, means for revolving the tool about an axis other than its true axis and also about its true axis, means for producing relative movement between the work piece and the tool longitudinally of the surface to be shaped, and means for simultaneously varying the relation between said axes continuously in predetermined timed relation with said longitudinal movement to obtain the desired shaping of the work piece.

10. In a machine for shaping an arcuate surface of varying cross-sectional character on a work piece, the combination of a revolvable tool, a support for the tool, means for supporting the work to revolve on a fixed axis, and means for simultaneously revolving the work and the tool in contact therewith to provide continuous longitudinal movement between the tool and the surface to be shaped.

11. In a machine for shaping an arcuate surface of varying cross-sectional character on a work piece, the combination of a revolvable tool, a support for the tool, means for revolving the tool on an axis other than its true axis and also about its true axis, means for supporting the work to revolve on a fixed axis, and means for simultaneously revolving the work as the revolvable axis of the tool is being changed to provide continuous longitudinal movement between the tool and the surface to be shaped.

12. In a machine for shaping a work piece, the combination of a rotary spindle, an arbor rotatably supported in the spindle and having its axis eccentrically disposed relative to the axis of the spindle, a tool carried by said arbor and having its cutting face eccentrically disposed relative to the axis of the arbor, and means comprising a pattern and a follower for adjusting the arbor by rotation relative to the spindle while the tool is cutting.

13. In a machine for shaping a work piece, the combination of a rotary spindle, an arbor rotatably supported in the spindle and having its axis eccentrically disposed relative to the axis of the spindle, a tool carried by said arbor and having its cutting face eccentrically disposed relative to the axis of the arbor, a nut supported to move longitudinally on the spindle and having a thread with a long lead angle engaging a complementary thread on the arbor, a multiplying lever arranged to move the nut longitudinally of the spindle to adjust the arbor by rotation relative to the spindle, and means comprising a pattern and a follower for operating the lever.

14. In a machine for shaping a work piece, the combination of a tool eccentrically mounted to revolve about an axis other than its true axis, means for varying the eccentricity of the tool, a multiplying lever for operating said means, a pattern and a follower arranged to actuate said lever, and a compensating cam interposed between said lever and said means to reproduce through said means an accurate multiple of the motion provided by the pattern.

15. In a machine for shaping a work piece, the combination of a tool arranged for revolution on an axis other than its true axis, means comprising a pattern and a follower to revolve the tool to vary its eccentricity, and means for adjusting the pattern to be effective during the complete cycle of the tool's revolution.

16. In a machine for shaping a work piece, the combination of a tool eccentrically mounted to revolve about an axis other than its true axis, means for varying the eccentricity of the tool, a pattern and a follower arranged to actuate said means to vary the eccentricity of the tool through a predetermined degree in proportion to the magnitude of the pattern, and means for changing the application of the operation of the pattern and the follower for any portion of the eccentric cycle of the tool.

17. In a machine of the character described, a tool mounted to revolve about its true axis and an axis eccentric thereto, means movable longitudinally of the tool for varying the eccentricity thereof within the limits of its eccentric movement, a reciprocal table arranged to operate said means, a lever arranged to reciprocate the table, a push bar engaging the lever, a follower carried by the push bar, a template shiftable relative to the push bar and arranged to be engaged by the follower for actuating the push bar to vary the eccentricity of the tool through a predetermined degree in proportion to the magnitude of the pattern, and means for changing the position of the follower axially of the push bar to make the pattern effective for any portion of the eccentric cycle of the tool.

18. In a machine of the character described, a tool arranged to revolve on its true axis and an axis eccentric thereto, and means arranged for lineal movement to vary the eccentricity of the tool, and compensating means for producing an increment of radial travel of the tool proportionate to an increment of lineal travel of said means.

19. In a machine of the character described, a tool arranged to revolve on its true axis and an axis eccentric thereto, and means arranged for lineal movement to vary the eccentricity of the tool, and compensating means comprising a cam having a continuous curve for producing an increment of radial travel of the tool proportionate to an increment of lineal travel of said means.

20. In a machine of the character described, a spindle, means for rotating the spindle, an arbor extending through and journaled in the spindle with its axis eccentric thereto, a tool carried on one end of the arbor, a thread on the other end of the arbor, a sleeve slidably keyed to the spindle and having an eccentric bore threaded to receive the arbor, means for shifting the sleeve to rotate the arbor relative to the spindle and move the tool in a spiral path, and compensating means for making an increment travel of the sleeve proportionate to an increment of the eccentric travel of the tool for the full range of the spiral travel thereof.

21. In a machine of the character described, a tool arranged to revolve on its true axis and an axis eccentric thereto, and means arranged for lineal movement to vary the eccentricity for each cutting stroke of the tool in a continuous spiral path to form a smooth cut surface in the work.

22. In a machine of the character described, a tool arranged to revolve on its true axis and an axis eccentric thereto, means arranged for lineal movement to vary the eccentricity for each cutting stroke of the tool in a continuous spiral path, a pattern and a follower for actuating said means, and means to adjust the follower to feed the tool on each successive cut until the surface is finished.

23. In a machine of the character described, a tool arranged to revolve on its true axis and an axis eccentric thereto, means arranged for lineal movement to vary the eccentricity for each cutting stroke of the tool in a continuous spiral path, a pattern and a follower for actuating said means, and a compensating cam operatively interposed between the first mentioned means and said follower.

24. In a machine of the character described, a tool arranged to revolve on its true axis and an axis eccentric thereto, means arranged for lineal movement to vary the eccentricity for each cutting stroke of the tool in a continuous spiral path, a pattern and a follower for actuating said means, and a compensating cam having a continuously curved contact surface operatively interposed between the first mentioned means and said follower.

ROBERT L. HIBBARD.